United States Patent [19]

Alfidi et al.

[11] 3,868,956
[45] Mar. 4, 1975

[54] VESSEL IMPLANTABLE APPLIANCE AND METHOD OF IMPLANTING IT

[76] Inventors: Ralph J. Alfidi, 742 Coy Ln., Chagrin Falls, Ohio 44022; William B. Cross, 746 Ecton Rd., Akron, Ohio 44303

[22] Filed: June 5, 1972

[21] Appl. No.: 259,463

[52] U.S. Cl. .................................. 128/345, 128/1 R
[51] Int. Cl. ..................... A61m 29/00, A61b 17/00
[58] Field of Search ............ 128/1 R, 325, 341, 345, 128/303.1

[56] References Cited
UNITED STATES PATENTS

| | | | |
|---|---|---|---|
| 2,499,761 | 3/1950 | Kraemer | 128/341 |
| 2,827,054 | 3/1958 | Towne | 128/341 |
| 3,334,629 | 8/1967 | Cohn | 128/325 |
| 3,409,016 | 11/1968 | Foley | 128/325 |
| 3,540,431 | 11/1970 | Mobin-Uddin | 128/1 R |

*Primary Examiner*—Channing L. Pace
*Attorney, Agent, or Firm*—Watts, Hoffmann, Fisher & Heinke

[57] ABSTRACT

An expansible appliance and methods of making and implanting it in a vessel of an animal. The expansible appliance comprises a nickel-titanium alloy which is initially formed in an expanded configuration and is then deformed to a straight-line configuration for implantation. Once placed in a desired position, the device is heated causing it to resume its expanded configuration. In one embodiment the appliance in its expanded configuration comprises a coil of wire used to expand or enlarge a vessel. In another embodiment the expansible appliance comprises a bundle of centrally connected wires which, in the expanded configuration, form a strainer or screen to trap blood clots in a blood vessel.

The expansible appliance is implanted within the vessel through a catheter by means of a novel and specialized detachable positioning device. The positioning device is provided with electrical conductors to supply electrical energy for heating the expansible appliance after it has been implanted. A control is provided for selectively regulating the electrical energy used to heat the expansible appliance. After the expansible appliance has been implanted and expanded, the positioning device is detached and withdrawn leaving the expansible device implanted in the vessel.

38 Claims, 20 Drawing Figures

PATENTED MAR 4 1975　　　　　　　　　3,868,956

VESSEL IMPLANTABLE APPLIANCE AND METHOD OF IMPLANTING IT

CROSS-REFERENCE TO RELATED PATENT

NICKEL-BASE ALLOYS, U.S. Pat. No. 3,174,851 issued Mar. 23, 1965 to William J. Buehler and Raymond C. Wiley.

BACKGROUND OF THE INVENTION

1. Field of the Invention

The present invention relates to expansible appliances for insertion into the vessel of an animal body, and a method of positioning and expanding such an appliance once inserted.

2. Prior Art

The advantages of the expansible appliances of the present invention can be best understood by a brief survey of some currently used surgical techniques they obviate. One example is in that situation where there is a danger of blood clots entering the heart. The technique which has been used is to open the neck of a patient and implant a cone-shaped sieve or strainer in the venae cavae to trap blood clots before they reach the heart. One problem encountered with this procedure is that the cone-shaped sieve may shift or cock in the vein and then cease to perform its function. The sieve may also migrate into the patient's heart. Another problem is that preparations for such an operation takes a relatively lengthy period of time, during which the time additional blood clots may form and one or more clots may well enter the heart of the patient.

A second example arises in conjunction with the disease known as arteriosclerosis. This disease causes constrictions to develop in blood vessels which constrictions restrict blood flow. When this occurs the patient suffers pain from angina due to the lack of blood in the heart arteries. This condition is commonly relieved by surgically bipassing the diseased portion of the vessel with a vein graft.

Still a third example is where the prostate gland becomes unduly enlarged so as to pinch off the urinary tract. This condition is ordinarily relieved by surgically removing the prostate gland.

As will be explained in greater detail, the present invention is designed to obviate the need for surgery in many of these types of body vessel impairments by the provision of expansible appliances which can be implanted in a vessel. The appliances are inserted through a catheter and then expanded either to form a strainer for blood clots or in order to expand a constricted vessel portion. These expansible appliances are preferably formed from titanium-nickel equiatomic intermetallic compounds.

So-called "recovery metals" such as titanium-nickel equiatomic intermetallic compounds have been the subject of a great deal of interest due to the extraordinary mechanical "memory" they posses. One such alloy is described in the referenced patent as typically comprising 52–56 percent nickel by weight, the remainder being titanium.

An initial shape may be permanently set into such recovery metals by heating them while they are constrained in the desired configuration. The forming temperature for setting the initial shape into the described titanium-nickel alloy is typically around 930°F. The alloy may then be cooled, and deformed plastically to a deformed configuration. The deformed configuration will be retained at room temperature. When the alloy is subsequently heated to a transition temperature, typically around 330°F., the alloy will recover its initial configuration.

SUMMARY OF THE INVENTION

The present invention utilizes the properties of recovery metals in a medical appliance adapted to be inserted within a vesel of an animal body. The appliance is inserted through a catheter into the vessel while deformed into a generally straight-line configuration, and is then heated so as to recover its initial expanded configuration.

In accordance with the present invention, a recovery metal such as the described titanium-nickel alloy in wire form is provided with an initial shape which will serve as either a screen or as a means for enlarging the vessel. A specially designed positioning device is provided for inserting these expansible appliances in a deformed, substantially straight-line configuration. After an expansible appliance is positioned, it is electrically heated so as to expand it to its initial configuration. Electrical conductors extending through the positioning device provide connection to a source of electrical energy for heating the expansible appliance.

The electrical heating can be performed in several fashions. In one embodiment, the expansible appliance comprises a member formed from a recovery metal and is electrically resistance heated by the flow of electrical current therethrough. In this form, the appliance is preferably electrically insulated along its surface so that abutting surface portions will not shunt current flow from any portion of the appliance. In another embodiment the expansible appliance comprises an assembly of recovery metal members which are conductively heated by a resistance heating element carried on the positioning device.

In one form, the expansible appliance of the present invention comprises a nickel-titanium wire which is initially formed in the configuration of a coil having an outer diameter which is greater than the inner diameter of the vessel to be enlarged. The wire is then deformed either into a substantially straight-line configuration or into a smaller more elongate coil for insertion into a vessel. Upon heating, the large diameter coil configuration is recovered whereby the walls of the vessel are pushed outwardly to expand the vessel. The cross-section of the wire can take any desired form. Where it is desired to enlarge the area of contact between the coil and the wall of the vessel, the wire cross-section can be made elliptical or substantially rectangular. A woven sleeve, of darcon or other plastic material, can also be positioned around the coil to further increase the area of contact with the vessel.

In another form the expansible appliance comprises an expansible sleeve formed of a recovery metal. The initial expanded form of the sleeve is a cylinder open at both ends. The deformed insertion configuration is that of a cylinder having longitudinally corrugated walls so as to reduce its diameter.

In another form, the expansible appliance comprises a bundle of nickel-titanium wires bound at a common position intermediate their ends. In its initial expanded configuration, the ends of the wires are fanned radially outwardly from the axis of the bundle. During insertion, the wires are deformed to a straight-line configuration and positioned within the vessel. Upon heating, the expanded configuration is recovered and the wires form a strainer or screen-line structure for trapping solid matter such as blood clots.

The positioning device is removably coupled to the expansible appliance. After the expansible appliance has been expanded, the positioning device is detached and withdrawn, leaving the expansible appliance implanted in the vessel.

A control console is provided for regulating the quantity and duration of electrical energy supplied to the heater. This enables the physician to expand the nickel-titanium wire appliance to the desired degree, and prevents such overheating of the expansible appliance as would cause damage to the vessel.

As will be apparent, one highly significant advantage of the present invention is the elimination of the need for surgery. Instead of opening the neck to insert a sieve or sieves, as has been done in the past, an expansible device is simply inserted into the venae cavae through a catheter, and expanded in place to provide a strainer. Furthermore, the strainer structure of the present invention in its expanded configuration has a ring of wire ends engaging the walls of the venae cavae at two spaced locations so as to prevent shifting and cocking of the strainer.

Likewise, instead of surgically removing or bypassing constricted vessel sections, as in the case of arteriosclerosis, and instead of removing an enlarged prostate gland where the urinary tract is pinched off, the expansible appliance is simply inserted into the constricted vessel and expanded to expand the constricted portion of the vessel. In many cases this procedure will permanently obviate the need for surgery, while in others it will provide relief until surgery can be performed at a more optimum time.

Other uses for such devices will be apparent such as common bile duct dilation; esophogeal dilation; gastrointestinal stenosis; intracardiac valvular stenosis; and the creation of various artificial passages.

The heating of the expansible appliance is preferably accomplished quickly so as to prevent damage to surrounding vessel walls. It should also be noted that ordinarily the expansible device is heated while immersed in fluid such as the patients blood which flows through a vessel, and the blood functions as a cooling medium serving to minimize the possibility of heat damage to the vessel.

In accordance with a method of the present invention, an expansible appliance of the described alloy is formed in an initial expanded configuration and is then plastically deformed to a generally straight-line or reduced diameter configuration. An elongated positioning device is connected to the expansible appliance, and by manipulating the positioning device, the expansible appliance is inserted through a catheter and is positioned within a vessel. A heating means is then activated to expand the expansible appliance to its initial expanded configuration. The positioning device is then disconnected from the expansible appliance and withdrawn, leaving the expansible appliance implanted within the vessel.

Accordingly, it is a general object of the present invention to provide a novel and improved expansible appliance for insertion in the vessel of an animal body, and novel methods for making expansible appliances and implanting them in vessels.

Other objects and a fuller understanding of the invention may be had by referring to the following description and claims taken in conjunction with the accompanying drawings.

DESCRIPTION OF THE PREFERRED EMBODIMENT

Figure 1:
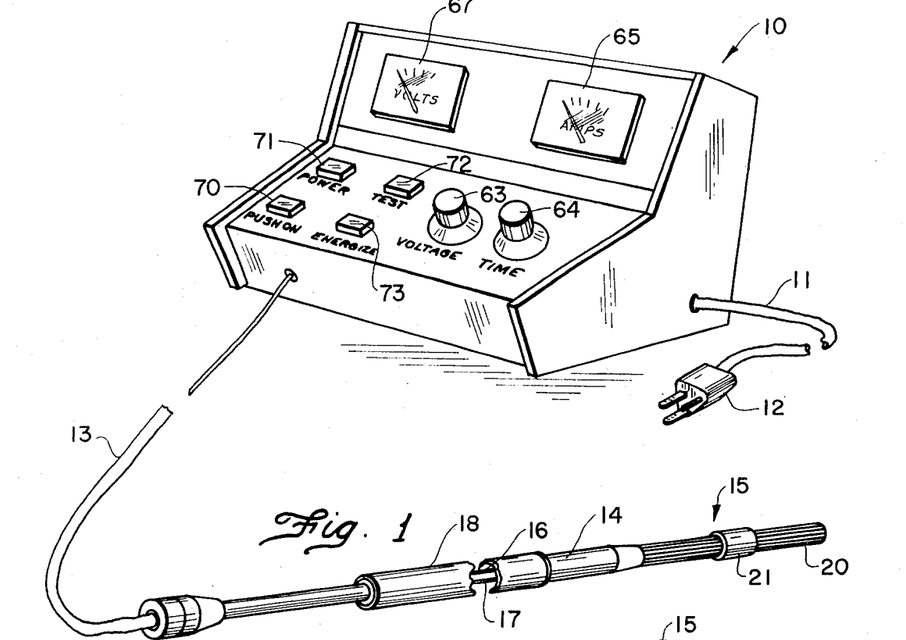
FIG. 1 is a perspective view of a control console coupled to one embodiment of positioning device and expansible appliance, the positioning device and expansible appliance being shown on a considerably enlarged scale relative to the console with the expansible appliance shown in its deformed configuration ready for insertion into a vessel of an animal.

Referring to FIG. 1, a control console is shown generally at 10. A three-wire electrical cable 11 is provided with a plug 12 for connecting the console 10 to a source of electrical energy. A series of controls provided on the console serve to regulate to quantity and duration of electrical energy supplied to a two-wire cable 13, as will be explained in greater detail.

An elongated positioning device 14 connects at one end with the cable 13. An expansible appliance 15 is detachably carried by the positioning device 14 adjacent its other end. As will be explained in greater detail, a pair of electrical conductors 16, 17 connect with the wires in the cable 13 and extend through the positioning device 14 to provide electrical energy to heat the expansible appliance 15.

The expansible appliance 15 comprises a plurality of wires bound together at a common position by a sleeve structure 21. The wires comprise an alloy which can be initially formed into a first configuration, subsequently plastically deformed to a second configuration, and heated to cause resumption of the first configuration. Such an alloy is sold under the trade name "55–NITINOL" and comprises 52–56 percent nickel, the remainder being titanium.

The expansible appliance 15 is formed by first clamping the bundle of wires 20 together with the sleeve structure 21. The ends of the wires 20 are then bent radially outwardly to the expanded configuration of FIG. 2, and constrained in this configuration while being heated to forming temperature of around 930°F. This procedure provides the wires with a mechanical "memory" of their expanded configuration.

In order to prepare the expansible appliance 15 for insertion into a vessel of an animal, the ends of the wires are again deformed, this time to the straight-line configuration of FIG. 1. When this deformation is performed at room temperature it will not affect the mechanical "memory" of the wires, even though they will retain, at room temperature, their straight-line configuration.

Insertion of the expansible appliance into a vessel is accomplished by means of a catheter tube 18. The proper positioning of the appliance may then be ascertained by means of an X-ray apparatus, also not shown.

After the expansible appliance has been inserted into a vessel and properly positioned, it is heated to a transition temperature of typically 330°F. to cause it to recover the expanded configuration which has been locked in its mechanical "memory." During this expansion the ends of the wires 20 deflect gently radially outwardly against the walls of the vessel. The wires will then retain this expanded configuration without any further application of heat. The positioning device is then disengaged from the expanded wire bundle and withdrawn leaving the expanded wire bundle implanted in the vessel.

The expansible appliance 15 is intended to serve as a strainer or screen to trap and collect solids flowing through the vessel. Such an appliance is particularly useful to trap blood clots and prevent their transmissions to the heart.

Figures 2, 3:
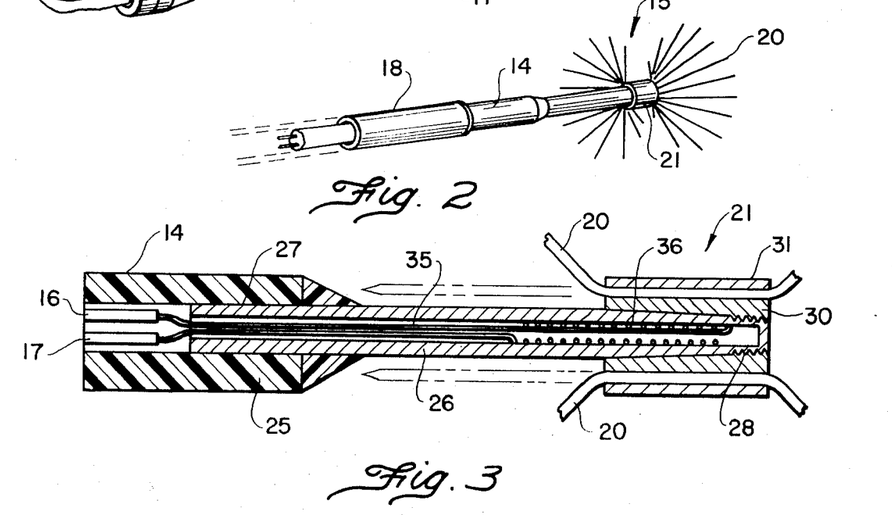
FIG. 2 is a perspective view on the same scale as FIG. 1 of a portion of the positioning device of the apparatus of FIG. 1 with the expansible appliance of FIG. 1 in its expanded configuration.
FIG. 3 is an enlarged cross-sectional view of a portion of the expansible appliance and positioning device of FIGS. 1 and 2.

Referring to FIG. 3, the construction of and the connection between the positioning device 14 and the expansible appliance 15 is illustrated in greater detail. The positioning device 14 comprises an outer insulator tube 25, preferably comprising teflon. A stainless steel heater tube 26 has one end 27 positioned within the insulator tube 25. The other end 28 of the tube 26 is slightly tapered and is threaded to engage the sleeve structure 21.

The sleeve structure 21 comprises inner and outer sleeves 30, 31. The inner sleeve is threaded onto the heater tube end 28. The outer sleeve serves to clamp the wires 20 against the inner sleeve.

A nichrome wire resistive heating element 35 is carried within the heating tube 26. The ends of the heating element 35 connect with the conductors 16, 17. Intermediate the ends of the heating element 35, the element is formed into a helical coil 36 for heating the tube 26 in the region adjacent the sleeve structure 21. Heat is transferred from the tube 26 by conduction to the sleeve structure 21 and the wires 20.

After the expansive appliance 15 has been expanded, removal of the positioning device 14 is effected by unscrewing the positioning device from the sleeve structure 21. The positioning device may then be withdrawn from the vessel by means of the catheter through which it was inserted.

Figures 4, 5:
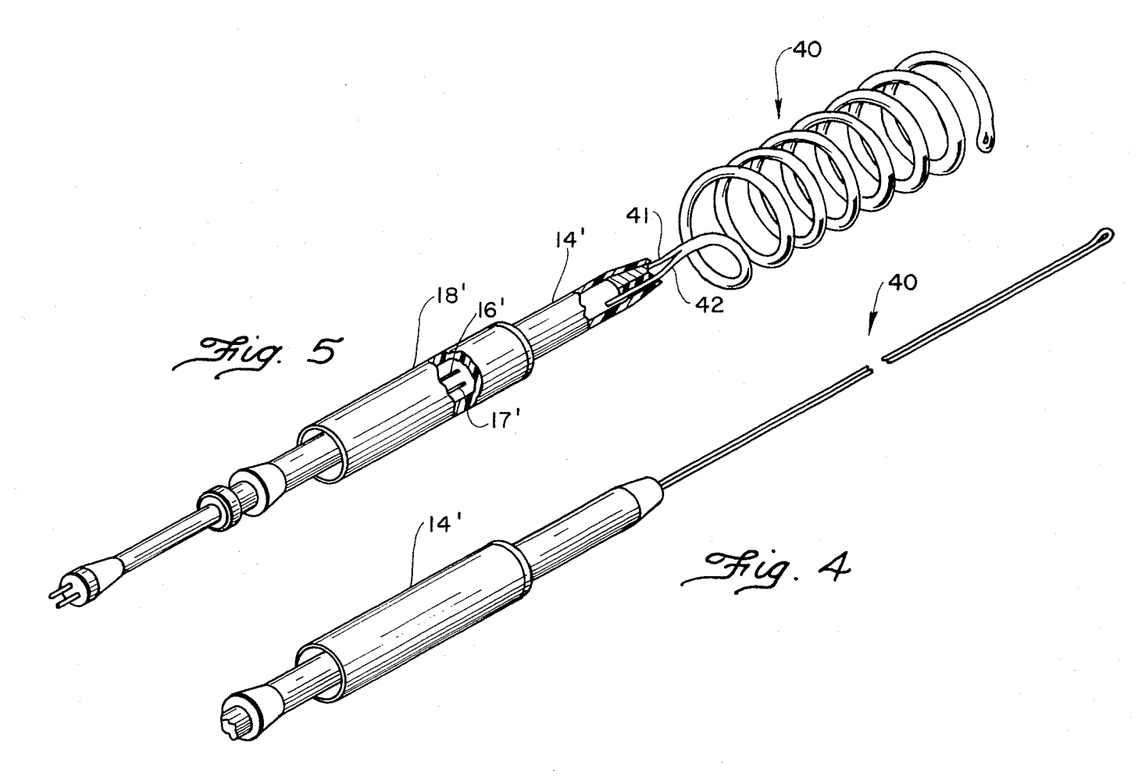
FIG. 4 is a perspective view of a second embodiment of an expansible appliance in its deformed configuration ready for insertion and supported on a positioning device.
FIG. 5 is a perspective view of the expansible appliance of FIG. 4 in its expanded configuration.

Referring to FIGS. 4 and 5, another embodiment of expansible appliance is shown generally at 40. The expansible appliance 40 comprises a loop of 55-NITINOL wire which, in its expanded configuration, forms a coil such that both ends 41, 42 of the wire loop are at one end of the coil, as shown in FIG. 5. For insertion into a vessel, the coil is deformed into a substantially straight-line configuration, as shown in FIG. 4.

The expansible appliance 40 is used in applications where a constricted vessel is to be enlarged. The appliance is formed so as to have an expanded diameter greater than the inner diameter of the vessel. By this arrangement when the appliance is inserted and expanded in the vessel, it will push radially outwardly on the walls of the vessel so as to enlarge the vessel.

Heating of the expansible appliance 40 is achieved in a different fashion from that of the previously described embodiment. Instead of providing an electrical resistance heating element to heat the nickel-titanium wire by conduction, the wire is heated directly by connecting it across a source of electrical energy. The ends 41, 42 are electrically connected to conductors 16', 17' which extend through a positioning device 14'. The wire loop is electrically insulated along its length to prevent abutting surface portions from shunting current flow from any one region of the appliance, thereby assuring a uniform current flow and uniform heating throughout. The insulation material is preferably selected from those materials which will not cause blood coagulation nor other undesirable biological reactions. One such material is Teflon.

Figure 6:
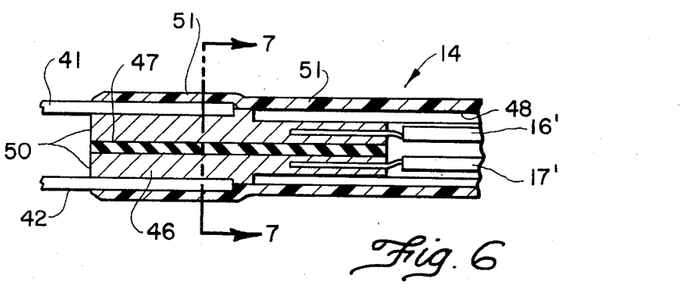
FIG. 6 is an enlarged cross-sectional view of a portion of the positioning device and expansible appliance of FIGS. 4 and 5 showing the electrical connection therebetween.
Figure 7:
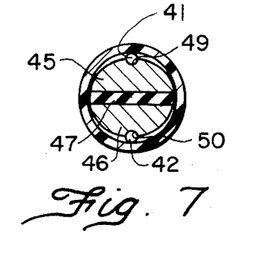
FIG. 7 is a cross-sectional view of the same scale as FIG. 6 as seen from the plane indicated by the line 7—7 in FIG. 6.
Figure 8:
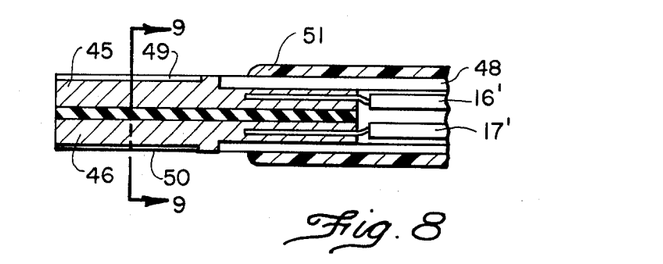
FIG. 8 is a cross-sectional view on the same scale as FIG. 6 of the positioning device of FIG. 6 after the expansible appliance has been detached.
Figure 9:
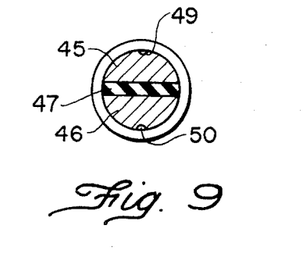
FIG. 9 is a cross-sectional view on the same scale as FIG. 8 as seen from the plane indicated by the line 9—9 in FIG. 8.

Referring to FIGS. 6–8, the connection between the positioning device 14' and the ends 41, 42 of the expansible appliance 40 is illustrated in greater detail. A pair of semi-circular stainless steel terminals 45, 46 sandwich a layer of insulating material 47. One end of each of the terminals 45, 46 is pressed into an electrically insulative tube 48. The other ends each have longitudinally extending grooves 49, 50. The ends 41, 42 of the expansible device 40 are positioned within the grooves 49, 50.

An insulative sleeve 51 is positioned over the insulative tube 48. The sleeve 51 is movable axially relative to the tube 48. The sleeve 51 is formed of a relatively resilient flexible material which may be expanded so as to extend over the ends 41, 42, shown in FIG. 6. By this arrangement, the sleeve 51 serves to clamp the ends 41, 42 in the grooves 49, 50 so as to make electrical contact with the terminals 45, 46. The clamped ends 41, 42 then serve to support the extensible appliance 40 in a cantilever fashion from the positioning device 14'.

Disconnection of the positioning device 14' from the ends 41, 42 is accomplished by axially moving the sleeve 51 to the retracted position of FIG. 8. In the retracted position, the sleeve 51 is withdrawn from the region of the grooves 49, 50, which frees the ends 41, 42 from the positioning device 14'.

The insertion and positioning of the expansible appliance 40 is accomplished in a manner identical to that described in conjunction with the expansible device 15. Heating is effected by supplying current from the console 10 through the wires 16', 17' to the ends 41, 42 of the appliance 40. Removal of the positioning device is effected by axially moving the sleeve 51 to the position of FIG. 8, and then withdrawing the positioning device leaving the expanded appliance 40 implanted in the vessel.

Figure 10:
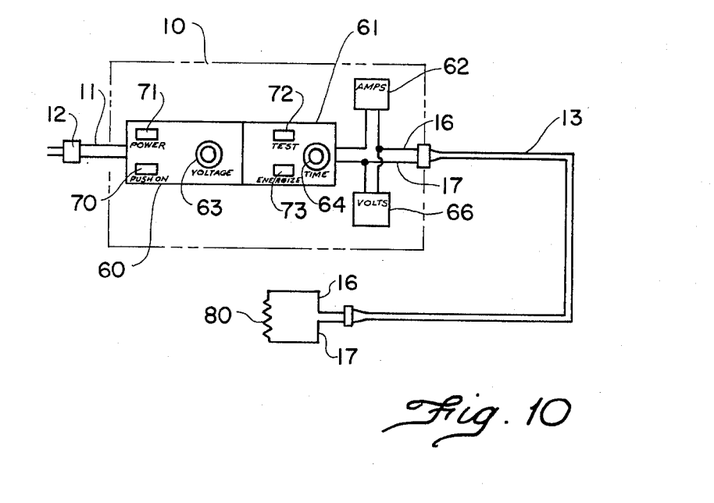
FIG. 10 is a schematic electrical circuit diagram of the electrical control circuitry connecting the positioning device to a source of electrical energy.

Referring to FIG. 10 in conjunction with FIG. 1, the control console 10 comprises a series of arrangements of a variable time control switch 61, and an ammeter 62. A voltage control knob 63 connects with the power supply 60 for selectively controlling the magnitude of the DC voltage supplied to a heating means shown schematically at 80. A time control knob 64 connects with the time control 61 for selectively controlling the duration of the energization of the heating means 80. The ammeter 62 is provided with a dial 65 for monitoring the current flow to the heating means 80. A voltmeter 66 having a dial 67 is connected across the conductors 16, 17 to similarly monitor the potential drop across the heating means 80.

An on-off switch 70 selectively connects and disconnects the power supply 60 with the input cable 11. An indicator light 71 glows when the power supply switch 70 is in its "on" position. A "test" switch 72 is provided to activate the power supply in a test mode without actually supplying energy to the heating means 80. While the required "test" circuitry is not shown in detail in FIG. 10, it is well known in the art. Lastly, an "energize" switch 73 is provided which will effect energization of the heating means 80 at the selected voltage and for the selected period of time.

The heating means 80 can take the form of either of the described embodiments. In the embodiment of FIG. 3, the heating means comprises the heating element 35. In the embodiment of FIG. 5, the heating means is the 55-NITINOL wire itself.

In operation, the selected embodiment of expansible appliance is attached to a suitable positioning means and inserted through a catheter into the selected vessel. Correct positioning of the expansible appliance is effected through manipulation of the positioning device, as monitored by means of an X-ray apparatus.

Once the expansible appliance is positioned, the console power is turned on by means of switch 70. The desired voltage and time settings are made by means of knobs 63, 64. The test button 72 may then be activated to ascertain that the voltage to be supplied in that which has been selected. The energization switch 73 is then actuated to heat the expansible appliance. When the expansible appliance has been implanted, the positioning device is disengaged and withdrawn from the vessel, thereby completing the procedure.

Figures 11, 12:
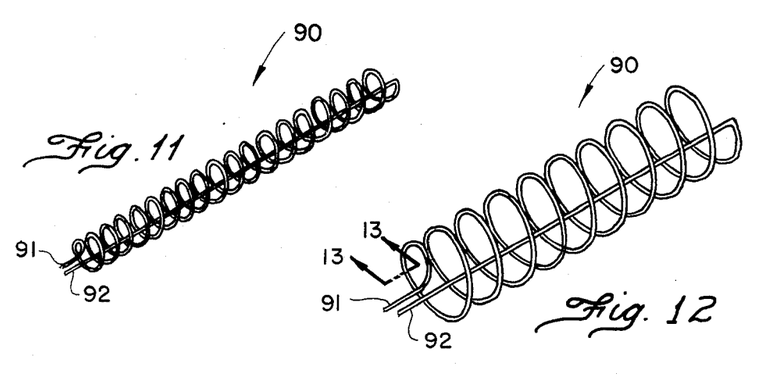
FIG. 11 is a perspective view of another embodiment of an expansible appliance in its deformed configuration ready for insertion.
FIG. 12 is a perspective view of the expansible appliance of FIG. 11 in its expanded configuration.

Referring to FIGS. 11 and 12, another expansible appliance embodiment is illustrated at 90 as comprising a coil of recovery metal wire having ends 91, 92. During insertion the appliance 90 takes the form of an elongated coil of relatively small diameter which is supported and positioned by the positioning device 14' as described in conjunction with the appliance 40 illustrated in FIGS. 4 and 5. The coiled appliance 90 is electrically insulated to prevent shunting of current by abutting surface portions during heating. In its expanded configuration, the appliance 90 comprises a shorter, larger diameter coil, as shown in FIG. 12.

Figure 13A:
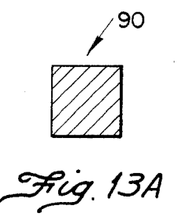
FIGS. 13A, 13B, 13C, 13D are enlarged alternative cross-sectional views as seen from the plane indicated by the line 13—13 in FIG. 12.
Figure 13B:
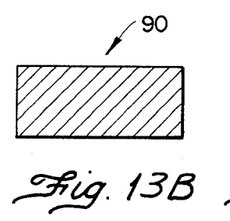
Figure 13C:
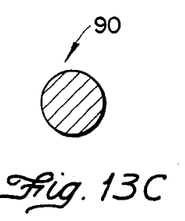
Figure 13D:
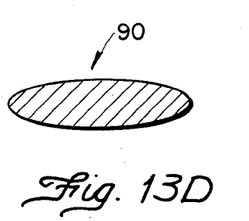

Referring to FIGS. 13A–13D, the cross-section of the wire comprising the coiled appliance 90 can comprise any of a variety of configurations. The substantially rectangular and substantially elliptical configurations of FIGS. 13B and 13D are advantageous from the point of view that they maximize the area of contact between the coiled appliance and the wall of the vessel within which the appliance is inserted.

Figure 14:
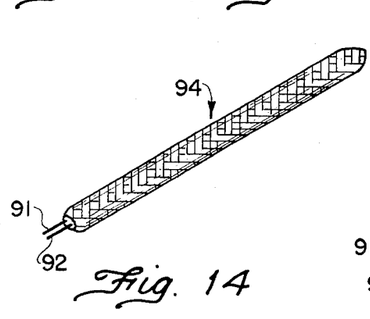
FIG. 14 is a perspective view of a woven sleeve structure in collapsed configuration for insertion and positioned on the appliance of FIG. 12.
Figure 15:
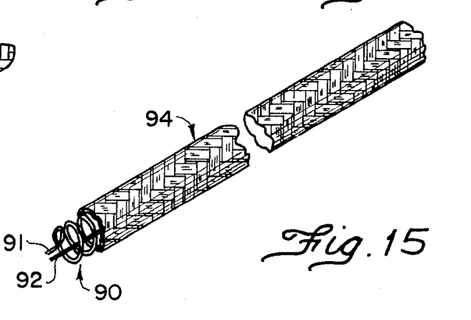
FIG. 15 is a perspective view of the sleeve and appliance assembly of FIG. 14 in expanded configuration.

FIGS. 14 and 15 illustrate a sleeve structure 94 positioned on the appliance 90 to further increase the area of contact between the expanding appliance and the surrounding vessel wall. The sleeve 94 preferably comprises a woven structure which can be expanded diametrically by contracting axially. The sleeve structure 94 can be formed from dacron or other plastic materials and is preferably secured at one or more points to the coiled appliance 90. Such woven sleeves can also be used with other described embodiments of the appliance.

Figure 16:
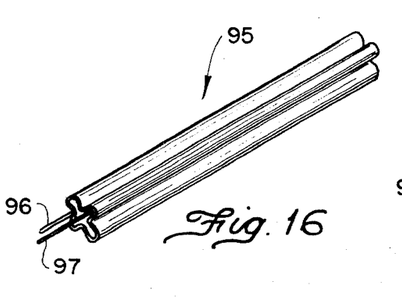
FIG. 16 is a perspective view of still another embodiment of an expansible appliance in its deformed configuration ready for insertion; and, FIG. 17 is a perspective view of the expansible appliance of FIG. 16 in its expanded configuration.
Figure 17:
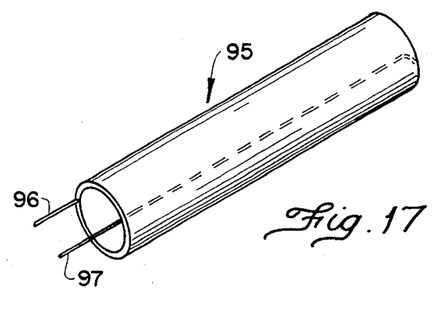

Referring to FIGS. 16 and 17, still another expansible appliance embodiment is illustrated at 95 as comprising a sleeve formed of a recovery metal and having electrodes 96, 97 attached thereto for heating the appliance 95 by passing current therethrough. The insertion configuration of the appliance, as shown in FIG. 16, comprises a longitudinally corrugated sleeve of relatively small diameter. The expanded configuration, as shown in FIG. 17, comprises a generally circular cylinder.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An appliance for implanting within a vessel of an animal body, said appliance comprising a structure formed from a recovery material, compatible with living body tissue, said structure having a predetermined initial configuration which said structure tends to assume upon the controlled application of a stimulus to said structure, and said structure being deformable to a second configuration suitable for facilitating implanting, in a vessel in an animal body, whereby said controlled application of said stimulus to a said appliance, when implanted, will cause said appliance to assume a configuration within said vessel which configuration is substantially similar to said initial configuration.

2. The appliance of claim 1 wherein said structure in its initial configuration has a maximum transverse dimension greater than its maximum transverse dimension in its second configuration whereby the application of said stimulus after insertion of said appliance within a vessel will cause said appliance to expand within the vessel.

3. The appliance of claim 2 wherein said structure in its second configuration comprises an elongate U-shaped loop of wire.

4. The appliance of claim 2 wherein said structure in its second configuration comprises, at least in part, a relatively small diameter coil of wire.

5. The appliance of claim 2 wherein said structure in its second configuration comprises, at least in part, a longitudinally corrugated tube.

6. The appliance of claim 1 additionally including an expansible sleeve of electrically non-conductive material surrounding portions of said structure for insertion and expansion therewith.

7. The appliance of claim 6 wherein said expansible sleeve comprises a woven plastic material.

8. The appliance of claim 1 wherein said structure in its second configuration comprises an array of elements forming a strainer, whereby expansion of the appliance within a vessel will provide a trap to prevent the passage of such foreign matter as blood clots.

9. The appliance of claim 8 wherein said structure comprises a bundle of wire elements secured together at at least one common position, and, in said second configuration, portions of said wire elements extend radially outwardly from said common position so as to engage the walls of a vessel.

10. The appliance of claim 1 wherein said structure in its said second configuration generates the contour of an open-ended cylinder.

11. The appliance of claim 10 wherein said structure in its said second configuration comprises, at least in part, a longitudinally corrugated tube.

12. The appliance of claim 10 wherein said structure in its said second configuration comprises, at least in part, a relatively small diameter coil of wire.

13. The appliance of claim 1 wherein said recovery material comprises a titanium nickel alloy comprising by weight approximately 52–56 percent nickel and 44–48 percent titanium.

14. An appliance for implanting within a vessel of an animal body, said appliance comprising an internally stressed structure of material compatible with living body tissue, said internally stressed structure being itself responsive to expand upon the application of a controlled stimulus to said internally stressed structure once it is installed within a vessel which stimulus will cause said structure to expand so as to at least partially relieve said internal stresses.

15. The appliance of claim 14 wherein said structure comprises a recovery metal which has been formed to an initial configuration, subsequently deformed to a second configuration, and which can be expanded to its approximate initial configuration by the application of heat energy thereto.

16. The appliance of claim 14 wherein said structure in its initial configuration has a maximum transverse dimension greater than its maximum transverse dimension in said second configuration, whereby the application of said stimulus after insertion of said appliance within a vessel will cause said appliance to expand within the vessel.

17. The appliance of claim 16 wherein said structure in said second configuration comprises an array of elements forming a strainer, whereby expansion of the appliance within the vessel will provide a trap to prevent the passage of such foreign matter as blood clots.

18. The appliance of claim 16 wherein said structure in said second configuration exerts a radially outward force on the walls of the vessel within which it is implanted so as to expand the vessel.

19. An appliance for implanting within a vessel of an animal body, said appliance comprising a structure formed of a recovery metal compatible with living body tissue and which comprises a titanium nickel alloy comprising by weight approximately 52–56 percent nickel and 44–48 percent titanium, said structure having a predetermined initial configuration which said structure tends to assume in response to the controlled application of a stimulus to said structure, said initial configuration being impartible to said structure in response to heating of said structure to a predetermined forming temperature, and said structure also being deformable at a temperature lower then said predetermined forming temperature into a second configuration different from said initial configuration for facilitating insertion of said appliance into a vessel.

20. The appliance of claim 19 wherein said structure in its second configuration comprises an elongate U-shaped loop of wire.

21. The appliance of claim 19 wherein said structure in its second configuration comprises, at least in part, a relatively small diameter coil of wire.

22. The appliance of claim 19 wherein said structure in its second configuration comprises, at least in part, a longitudinally corrugated tube.

23. The appliance of claim 19 additionally including an expansible sleeve of electrically non-conductive material surrounding portions of said structure for insertion and expansion therewith.

24. The combination of an expansible appliance and an apparatus for implanting the appliance within the vessel of an animal body, said combination comprising:

a. an expansible structure formed from a recovery material compatible with living body tissue and having a initial expanded configuration to which said expansible structure tends to return upon the heating of said expansible structure to a predetermined temperature, said expansible structure additionally being deformible to a reduced diameter configuration having a diameter less then that of said expanded configuration for facilitating insertion of said expansible structure into an animal vessel;

b. a positioning structure comprising an elongated device releasably connected to said expansible structure c. one of said structures including electrically responsive heating means to heat said expansible structure so as to cause said expansible structure to assume its initial expanded configuration after being implanted in an animal vessel; and, d. said positioning structure being provided with electrical conductors adapted to electrically couple said heating means to a source of electrical energy.

25. The combination of claim 24 wherein said heating means comprises an electrical resistance heating element carried by said positioning structure and adapted to heat said expansible structure by conduction.

26. The combination of claim 24 wherein said heating means comprises at least a portion of said expansible structure, and said electrical conductors carried by said positioning structure are adapted to connect said portion across a source of electrical energy, whereby said expansible device is heated by the flow of electrical current through said portion.

27. A positioning device for inserting an expansible appliance through a catheter and into a vessel of an animal body for implantation therewith, and wherein the expansible appliance is comprised of a recovery material that will expand to a desired shape upon heating to a predetermined temperature, comprising:
   a. an elongated body of sufficiently small diameter as to pass freely through a catheter and into an animal vessel;
   b. connection means for releasably engaging an expansible appliance for inserting the appliance into an animal vessel;
   c. electrical conductors adapted for connection to a source of electrical energy; and,
   d. an electrical resistance heating element electrically connected to said conductors and adapted to heat an expansible appliance which has been connected to the positioning device so as to expand the appliance to a desired shape.

28. A positioning device for inserting an expansible appliance through a catheter and into a vessel of an animal body for implantation therein, wherein the expansible appliance is comprised of a recovery material that will expand to a desired shape upon heating to a predetermined temperature, and wherein at least a portion of the expansible appliance comprises a heating means which, when connected across a source of electrical energy, will serve to heat the expansible appliance and expand it to the desired shape, the positioning device comprising:
   a. an elongated body of sufficiently small diameter as to pass freely through a catheter and into an animal vessel;
   b. connection means for releasably engaging an expansible appliance for inserting the appliance into an animal vessel;
   c. electrical conductors adapted for connection to a source of electrical energy; and,
   d. electrical coupling means for releasably electrically connecting the heating means to said conductors for supplying electrical energy to the heating means.

29. The positioning device of claim 28 additionally including electrical control means interposed between said conductors and a source of electrical energy so as to regulate the quantity of electrical energy which is transmitted to the appliance.

30. The apparatus of claim 29 wherein said electrical control means includes means for selectively controlling the duration of time during which electrical energy is supplied to heat the appliance.

31. The apparatus of claim 30 wherein said electrical control means includes means for selectively controlling the voltage of the electrical energy supplied to heat the appliance.

32. A method of expanding a portion of an animal vessel comprising the steps of:
   a. inserting a catheter into the vessel;
   b. providing an expansible appliance comprising a structure formed from a recovery material compatible with living body tissue, said structure having a predetermined initial configuration which said structure tends to assume upon the controlled application of a stimulus to said structure, and said structure being deformible to a second configuration suitable for facilitating implanting in a vessel in an animal body whereby said controlled application of said stimulus to a said appliance when implanted will cause said appliance to assume a configuration within said vessel which is substantially similar to said initial configuration, said initial configuration having an outer diameter greater than the initial inner diameter of the vessel to be expanded;
   c. deforming the appliance for insertion through the catheter into the vessel portion;
   d. releasably coupling the appliance to a positioning device which is of sufficiently small cross section as to pass freely through the catheter and into the vessel portion;
   e. inserting the deformed appliance through the catheter and into the vessel portion by manipulating the positioning device;
   f. expanding the deformed appliance once it is in position within the vessel portion, and,
   g. removing the catheter and positioning device from the vessel so as to leave the expanded appliance implanted therein.

33. The combination of claim 26 wherein the reduced diameter configuration is a substantially linear configuration of said expansible structure.

34. A method of implanting an expansible appliance within an animal vessel wherein the expansible appliance is comprised of a recovery material having a memory and which will expand to a desired shape upon the application of a controlled stimulus thereto, comprising the steps of:
   a. releasably coupling the appliance to an elongated positioning device which is of sufficiently small cross section so as to pass freely through the vessel within which the appliance is to be implanted;
   b. manipulating the positioning device within the vessel so as to position the appliance at a desired location within the vessel;
   c. applying a controlled stimulus to the appliance to effect expansion of the appliance to a desired shape wherein the appliance engages the walls of the vessel;
   d. disengaging the positioning device from the expanded appliance; and,
   e. removing the positioning device from the vessel so as to leave the appliance implanted within the vessel.

35. The method of claim 34 wherein a portion expansible appliance comprises an electrical resistance heating means, and said step of applying a controlled stimulus to the appliance comprises supplying a regulated quantity of electrical energy to said heating means.

36. The method of claim 34 wherein the positioning device is provided with an electrical resistance heating means and said step of applying a controlled stimulus to the appliance comprises supplying a regulated quantity of electrical energy to said heating means to heat the appliance.

37. The method of claim 34 wherein the expansible appliance comprises a structure formed of a titanium nickel alloy comprising by weight approximately 52–56 percent nickel and 44–48 percent titanium, additionally including the steps of:

a. initially forming the structure in an expanded configuration;
b. heating the structure in the expanded configuration to a predetermined temperature to impart the expanded configuration into the memory of the alloy;
c. cooling the structure to ambient temperature; and,
d. plastically deforming the structure to a substantially straight-line configuration prior to coupling the appliance to the positioning device for insertion into an animal vessel.

38. A body implantable appliance for implantation in a vessel of an animal comprising:
a. an elongated member formed of material which can be body implanted without harmful reaction, irritation or poisoning of the body fuilds, of a vessel or of the walls of said vessels;
b. said members having an initial configuration of expanded transverse dimension and predetermined contour, which initial configuration said member tends to assume in response to the application of stimulating energy to the member whereby the member may be implanted in a vessel in a configuration of lesser transverse dimension than said initial configuration and thereafter altered in configuration to assume said predetermined contour of said initial configuration to expand the walls of said vessel.

* * * * *